United States Patent
Park (10) Patent No.: US 11,547,219 B2
(45) Date of Patent: Jan. 10, 2023

(54) BODY CARE APPARATUS

(71) Applicant: LG ELECTRONICS INC., Seoul (KR)

(72) Inventor: Jong Jin Park, Bucheon-si (KR)

(73) Assignee: LG ELECTRONICS INC., Seoul (KR)

(*) Notice: Subject to any disclaimer, the term of this patent is extended or adjusted under 35 U.S.C. 154(b) by 700 days.

(21) Appl. No.: 16/568,119

(22) Filed: Sep. 11, 2019

(65) Prior Publication Data
US 2020/0000244 A1 Jan. 2, 2020

(30) Foreign Application Priority Data

Jun. 11, 2019 (KR) .................. 10-2019-0068598

(51) Int. Cl.
| | |
|---|---|
| *A47C 31/00* | (2006.01) |
| *G06N 20/00* | (2019.01) |
| *G06F 1/16* | (2006.01) |
| *A61H 1/00* | (2006.01) |
| *A47C 7/72* | (2006.01) |
| *B60N 2/90* | (2018.01) |

(52) U.S. Cl.
CPC .............. *A47C 31/008* (2013.01); *A47C 7/72* (2013.01); *A61H 1/00* (2013.01); *B60N 2/976* (2018.02); *G06F 1/163* (2013.01); *G06N 20/00* (2019.01); *A61H 2201/0149* (2013.01); *A61H 2201/501* (2013.01); *A61H 2201/5007* (2013.01); *A61H 2201/5097* (2013.01); *A61H 2230/045* (2013.01); *A61H 2230/505* (2013.01); *A61H 2230/625* (2013.01); *A61H 2230/655* (2013.01)

(58) Field of Classification Search
CPC .............................. A47C 31/008; B60N 2/976
USPC ........................................................... 601/49
See application file for complete search history.

(56) References Cited

U.S. PATENT DOCUMENTS

2017/0147074 A1* 5/2017 Buttolo .................... B60N 2/02

FOREIGN PATENT DOCUMENTS

| KR | 101305565 | 9/2013 |
|---|---|---|
| KR | 101879209 | 7/2018 |

* cited by examiner

*Primary Examiner* — Nadia A Mahmood
(74) *Attorney, Agent, or Firm* — Lee Hong Degerman Kang & Waimey (57) ABSTRACT

A body care apparatus capable of providing optimal therapeutic care for a body of a user is provided. The body care apparatus includes a wearable device worn on the body of the user so as to obtain activity data of the user, a massage chair performing a massage on each body part of the user while supporting the body of the user, a data analyzing unit inferring condition data for each body part of the user according to the activity data obtained from the wearable device, and a controller controlling an operation of the massage chair according to the condition data inferred by the data analyzing unit. The body care apparatus may infer the condition data by deep learning of an artificial intelligence algorithm or a sensor fusion.

17 Claims, 9 Drawing Sheets

BODY CARE APPARATUS

CROSS-REFERENCE TO RELATED APPLICATIONS

Pursuant to 35 U.S.C. § 119(a), this application claims the benefit of earlier filing date and right of priority to Korean Application No. 10-2019-0068598, filed on Jun. 11, 2019, the contents of which are all hereby incorporated by reference herein in its entirety.

BACKGROUND

1. Field of the Invention

The present disclosure relates to a body care apparatus for providing optimal therapeutic care for a body of a user.

2. Description of Related Art

In accordance with the aging population trend in contemporary society, people have a heightened awareness of health care, health maintenance, and health promotion, regardless of age or gender. Accordingly, many people are trying to care for, maintain, or improve their health by using facilities such as medical facilities and sports clubs.

Moreover, many people are making an effort to relieve fatigue and stress, as well as to maintain or improve health and fitness. To this end, various body care apparatuses, such as massaging devices, have been developed and are being widely used in real life.

Massage is one medical aid for helping blood circulation and relieving fatigue by sweeping, kneading, pressing, pulling, tapping, or moving a body with a hand or a specialized device. A device performing a massage by means of a mechanical device is referred to as a massage device, and various mechanical components are used in a massage device for effectively performing a massage.

Regarding such massage devices, a massage chair, in which a user comfortably sits and receives a massage, is mainly used, and such a massage chair may be regarded as a representative body care apparatus.

In addition, in the case of a vehicle, an essential means of transportation for modern people, body care functions such as massage stimulation are being applied to the seat of a vehicle, for the purpose of relieving fatigue and activating the biorhythm of occupants as well as the driver. In particular, in the case of the vehicle seat with a body care function applied thereto, a function of preventing drowsiness is provided for a driver, thereby enhancing safety in driving the vehicle.

As described above, the need for a body care apparatus, massaging or stimulating a body for recovery of the user's fatigue, relieving stress, and activating biorhythmic rhythm, is gradually increasing, and a field of application thereof is also expanding day by day.

According to the trend described above, various attempts have been made to allow a body care apparatus perform its functions more effectively, and there is a need to develop new technology to support this.

Accordingly, in order to provide optimal therapeutic care according to the condition of the user, it is necessary to determine a degree of fatigue and a degree of need of stretching of the user more accurately, and to reflect these in the operation of the body care apparatus.

In detail, it is necessary to determine the degree of fatigue and the degree of need of stretching for each body part, since the types of therapeutic care (for example, a massage or stretching) required for each part of the body of the user may be different.

However, since it is preferable for a process of determining the degree of fatigue and the degree of need of stretching not to be troublesome for the user, it is necessary for such a process to be naturally performed, without the user being consciously aware of the process.

Regarding the body care apparatus described above, in Korean Patent Registration No. 10-1879209 (hereinafter, referred to as 'Related Art 1'), disclosed is a massage chair capable of performing health care through bio-signal recognition.

In detail, in Related Art 1, it is disclosed that a bio-signal of the user, in contact with a sensor installed in a massage chair, is measured, and then the bio-signal is reflected in an operation of the massage chair to provide massage services customized for each user.

However, in the case of the massage chair of Related Art 1, only biological characteristics through, for example, an electrocardiogram, a heart rate, skin electrical activity, and a skin temperature, and body characteristics through, for example, body weight, a shoulder width, a shoulder position and a sitting position, are measured. There is thus no consideration of a physical condition of the particular day (for example, the amount of muscular activity during the day and the type of muscular activity), which should be substantially reflected in order to determine fatigue recovery or the need for stretching.

In addition, since data classified according to each part of the body is not used, it is difficult to determine the degree of fatigue and the necessary degree of need of stretching for each body part.

Moreover, in Korean Patent Registration No. 10-1305565 (hereinafter, referred to as 'Related Art 2'), disclosed is an acoustic active seat apparatus.

In detail, in Related Art 2, it is disclosed that the intensity of massage is automatically adjusted according to the body type and the riding position of an occupant seated in a vehicle seat.

However, in the case of the vehicle seat of Related Art 2, only data of a seated state of an occupant is reflected. It is thus difficult to determine data on which type of physical activity was performed by the occupant prior to seating, and accordingly, on which type of therapeutic care is needed.

Moreover, in a manner similar to Related Art 1, in Related Art 2, it is also difficult to determine the degree of fatigue and the degree of need of stretching for each body part.

As described above, body care apparatuses in the related art are faced with various shortcomings in providing optimal therapeutic care for the body of the user.

SUMMARY OF THE INVENTION

Aspects of the present disclosure presented herein address the shortcomings discussed above.

An aspect of the present disclosure is to more accurately determine a type and characteristics of therapeutic care required by a user using a body care apparatus, by reflecting activity data of the user generated before the therapeutic care is provided to the body of the user.

An aspect of the present disclosure is to individually determine a degree of fatigue and a degree of need of stretching of each body part, and perform the optimal therapeutic care for each part of a body.

An aspect of the present disclosure is to allow a user to easily use a body care apparatus without going through a separate complicated process, by naturally obtaining activity data of the user in daily life.

The present disclosure is not limited to the above-mentioned aspects, and other aspects, which are not mentioned, may be clearly understood by those skilled in the art from the description below.

A body care apparatus according to an aspect of the present disclosure is configured to obtain activity data of a user in advance, and to reflect the activity data in a type of therapeutic care provided to a body of the user. The body care apparatus is configured to obtain the activity data of the user, generated before the therapeutic care is provided to the body of the user, and control an operation of a massage chair according to condition data of the body, inferred through the activity data.

The body care apparatus according to an aspect of the present disclosure is configured to infer the condition data for each body part of the user, and provide the therapeutic care to each part of the body according to the inferred condition data. Specifically, the body care apparatus is configured to infer condition data for each body part of the user according to the activity data of the user, and reflect the condition data for each body part in an operation of a massage chair.

The body care apparatus according to an aspect of the present disclosure is configured to obtain activity data of the user naturally in the daily life of the user. Specifically, the body care apparatus is configured to obtain the activity data of the user naturally through a wearable device worn on a body of a user, and reflect the activity data in an operation of the massage chair.

The body care apparatus according to an aspect of the present disclosure may store activity data, obtained from the wearable device, and then reflect the activity data in an operation control of the massage chair.

The body care apparatus according to an aspect of the present disclosure may store the obtained activity data in the wearable device, and then transmit the activity data and reflect the activity data in the operation control of the massage chair.

According to the body care apparatus according to an aspect of the present disclosure, the massage chair may receive the transmitted activity data, and may then infer the condition data of the body by itself and be controlled according to the inferred condition data.

According to the body care apparatus according to an aspect of the present disclosure, a home server may receive the transmitted activity data, and may then extract only data on a massage chair and transmit the extracted data to the massage chair.

According to the body care apparatus according to an aspect of the present disclosure, the home server may receive the transmitted activity data, and may then infer condition data of a body and transmit, to the massage chair, a control signal based on the inferred condition data.

The body care apparatus according to an aspect of the present disclosure may store the activity data of the user, obtained from a plurality of wearable devices, in at least one data storage unit.

The body care apparatus according to an aspect of the present disclosure may receive feedback from the user with respect to the activity data, and adjust the condition data according to the received feedback.

The body care apparatus according to an aspect of the present disclosure may receive feedback from the user with respect to operation data of the massage chair, and adjust the operation of the massage chair according to the received feedback.

A body care apparatus according to another aspect of the present disclosure is configured to obtain activity data of a user in advance and obtain biometric data of the user in real time, and to reflect the activity data and the biometric data in a type of therapeutic care provided to a body of the user. Specifically, the body care apparatus is configured to obtain activity data of the user, generated before the therapeutic care is provided to the body of the user, and obtain biometric data of the user while the therapeutic care is being provided to the body of a user, and to control an operation of a vehicle seat according to condition data of the body inferred through the activity data and the biometric data.

The body care apparatus according to an aspect of the present disclosure is configured to infer the condition data for each body part of the user, and provide the therapeutic care to each part of the body according to the inferred condition data. Specifically, the body care apparatus is configured to infer condition data for each body part of the user according to the activity data and the biometric data of the user, and reflect the condition data for each body part in an operation of a vehicle seat.

The body care apparatus according to an aspect of the present disclosure is configured to obtain activity data of the user naturally in the daily life of the user. Specifically, body care apparatus is configured to obtain the activity data of the user naturally through a wearable device worn on a body of a user, and reflect the activity data in an operation of the vehicle seat.

The body care apparatus according to an aspect of the present disclosure may store the activity data obtained by the wearable device, and then reflect the activity data in an operation control of the vehicle seat.

The body care apparatus according to an aspect of the present disclosure may store the obtained activity data in the wearable device, and then transmit the activity data and reflect the activity data in the operation control of the vehicle seat.

According to the body care apparatus according to an aspect of the present disclosure, the vehicle seat may receive the transmitted activity data, and may then infer the condition data of the body by itself and be controlled according to the inferred condition data.

The body care apparatus according to an aspect of the present disclosure may obtain driving data of a vehicle in real time, and control an operation of a vehicle seat according to the condition data and the driving data.

The present disclosure is not limited to what has been described above, and other aspects, which are not mentioned, may be clearly understood by those skilled in the art from the description below.

According to at least one embodiment of the present disclosure, since activity data of a user, generated before therapeutic care is provided to a body of a user, may be obtained, and an operation of a massage chair may be controlled according to condition data of the body inferred through the activity data, a type and characteristics of therapeutic care required by the user may be more accurately determined.

Since condition data for each body part of the user may be inferred according to the activity data of the user, and the condition data for each body part may be reflected in an operation of a massage chair, an optimal type of therapeutic care may be performed for each part of the body.

Since activity data of the user may be obtained naturally through a wearable device worn on the body of the user, and the activity data may be reflected in an operation of the massage chair, the user may easily use the body care apparatus without going through an additional inconvenient process.

Since the activity data obtained by the wearable device may be stored, and may then be reflected in an operation control of the massage chair, reliability of the condition data, inferred using a large amount of activity data, may be enhanced.

Since the obtained activity data may be stored in the wearable device, and may then be transmitted and reflected in the operation control of the massage chair, data may be automatically transmitted even when the user does not perform an additional data transmission process.

Since the massage chair may receive the transmitted activity data, and then infer the condition data of the body by itself and be controlled according to the inferred condition data, a function of the body care apparatus may be smoothly implemented, without going through, for example, a separate server.

Since a home server may receive the transmitted activity data, and then extract only data for the massage chair and transmit the extracted data to the massage chair, unnecessary data may be prevented from being transmitted to the massage chair, and issues relating to privacy in using an external server may be addressed.

Since the home server may receive the transmitted activity data and then infer the condition data of a body, and transmit a control signal formed according to the inferred condition data, the massage chair may operate in conjunction with various devices on a home network through the home server, and a structure of the massage chair may be simplified.

Since the activity data of the user, obtained from a plurality of wearable devices, may be stored in at least one data storage unit, components for storing and transmitting data may be significantly reduced, even when complex activity data of a body is obtained using the plurality of wearable devices.

Since feedback on the activity data may be received from the user and the condition data may be adjusted according to the received feedback, accuracy of the activity data may be further enhanced.

Since feedback on operation data of the massage chair may be received from the user and an operation of the massage chair may be adjusted according to the received feedback, the requirements of the user may be reflected, and more satisfactory therapeutic care may be provided.

Since the activity data of the user, generated before the therapeutic care is provided to the body of the user, may be obtained, and the biometric data of the user may be obtained while the therapeutic care is being provided to the body of the user, an operation of the vehicle seat may be controlled according to condition data of the body inferred through the activity data and the biometric data, and a type and characteristics of the therapeutic care required by the user may be more accurately determined.

Since the condition data for each body part of the user may be inferred according to the activity data and the biometric data of the user, and the condition data for each body part may be reflected in an operation of the vehicle seat, an optimal type of therapeutic care may be performed for each part of a body.

Since activity data of the user may be obtained naturally through a wearable device worn on the body of the user, and the activity data may be reflected in an operation of the vehicle seat, the user may easily use the body care apparatus without going through an additional inconvenient process.

Since the activity data obtained by the wearable device may be stored, and may then be reflected in an operation control of the vehicle seat, reliability of the condition data, inferred using a large amount of activity data, may be enhanced.

Since the obtained activity data may be stored in the wearable device, and may then be transmitted and reflected in the operation control of the vehicle seat, data may be automatically transmitted even when the user does not perform an additional data transmission process.

Since the vehicle seat may receive the transmitted activity data, and may infer condition data of a body by itself and be controlled according to the inferred condition data, a function of the body care apparatus may be smoothly implemented without going through, for example, a separate server.

Since driving data of a vehicle may be obtained in real time, and an operation of the vehicle seat may be controlled according to the condition data and the driving data, a type and characteristics of the therapeutic care provided to the user may be suitably changed according to a driving state of the vehicle.

Further scope of applicability of the present disclosure will be apparent from the above detailed description. It should be understood, however, that specific examples, such as the detailed description and the preferred embodiments of the present disclosure, are given by way of illustration only, since various changes and modifications within the spirit and scope of the present disclosure will become apparent to those skilled in the art.

BRIEF DESCRIPTION OF THE DRAWINGS

The foregoing and other aspects, features, and advantages of the present disclosure, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

Figure 1:
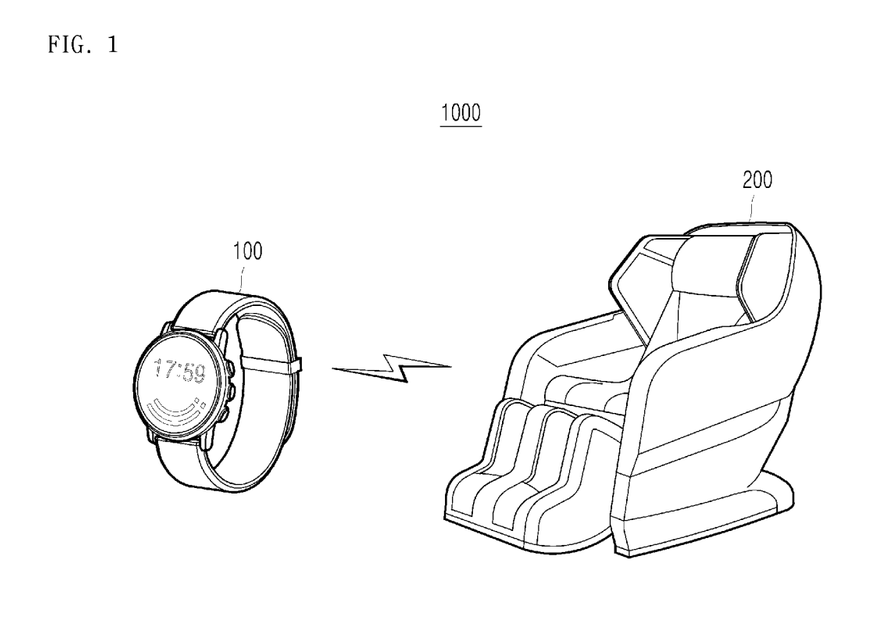
FIG. 1 is a view of a body care apparatus according to a first embodiment of the present disclosure.
Figure 2:
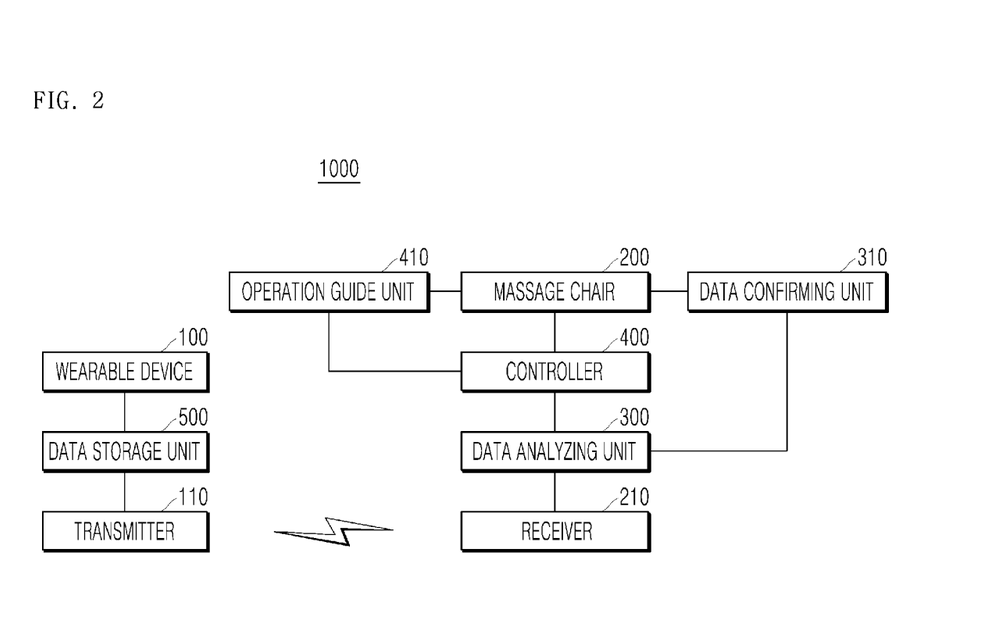
FIG. 2 is a schematic view of a main component of the body care apparatus according to the first embodiment of the present disclosure.
Figure 3:
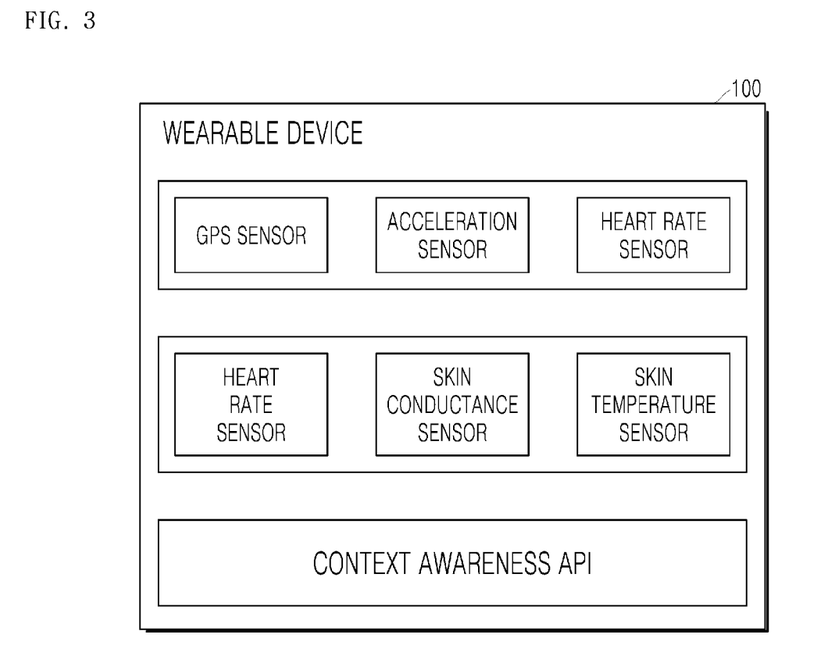
FIG. 3 is a view of a main component of a wearable device in the body care apparatus according to the first embodiment of the present disclosure.
Figure 4:
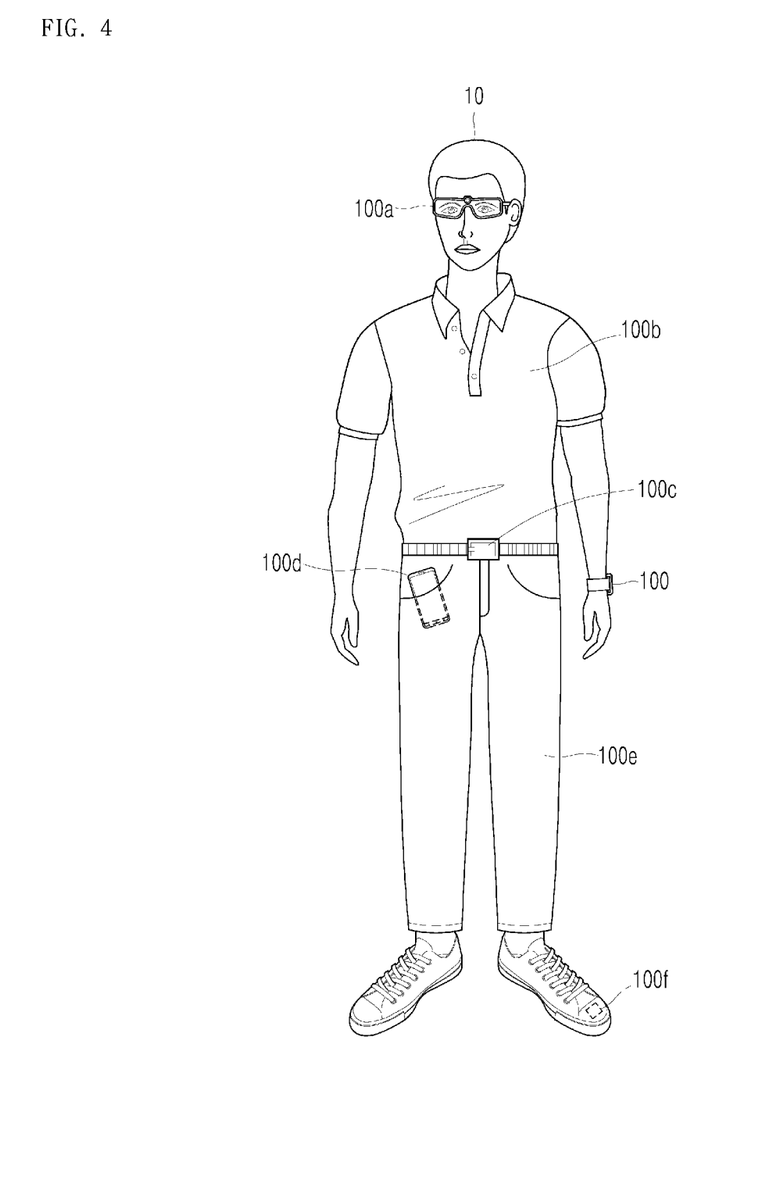
FIG. 4 is a view of a user wearing the wearable device in the body care apparatus according to the first embodiment of the present disclosure.

FIG. 1 is a view of a body care apparatus according to a first embodiment of the present disclosure. FIG. 2 is a schematic view of a main component of the body care apparatus according to the first embodiment of the present disclosure. FIG. 3 is a view of a main component of a wearable device in the body care apparatus according to the first embodiment of the present disclosure. FIG. 4 is a view of a user wearing the wearable device in the body care apparatus according to the first embodiment of the present disclosure.

As illustrated in FIGS. 1 to 4, a body care apparatus 1000 according to the first embodiment of the present disclosure includes a wearable device 100, a massage chair 200, a data analyzing unit 300, and a controller 400, and may further include a data storage unit 500, a data confirming unit 310, and an operation guide unit 410.

The wearable device 100, a part worn on a body of a user so as to obtain activity data of a user 10, may be composed of at least one among components including, for example, a smart watch 100, smart glasses 100a, a smart shirt 100b, a smart belt 100c, a smartphone 100d, smart pants 100e, and smart shoes 100f.

In detail, as illustrated in FIG. 3, the wearable device 100 may be configured to collect data such as activity data of the user 10, bio-signal data, and context awareness data.

For example, location data of the user 10 may be obtained through a global positioning system (GPS) sensor, movement of, for example, a body, arms, and legs may be measured through an acceleration sensor, and rotation data of, for example, a wrist and a shoulder may be measured through a gyroscope.

In addition, a heart rate and a cardiac cycle, for example, may be measured through a heart rate sensor, a conductance response of skin due to a degree of sweating may be measured through a skin conductance sensor, and a temperature of skin due to intensity of exercise may be measured through a skin temperature sensor.

Moreover, awareness data on situations such as walking, running, moving by means of a vehicle, and moving by means of a bicycle may be obtained through a context awareness application program interface (API).

A combination of the data obtained through the main component as described above is referred to as activity data of the user 10, and such activity data may be obtained continuously before the body care apparatus 1000 is used by the user 10.

Meanwhile, the components, illustrated in FIG. 3, are provided only for convenience of explanation, and the components of the wearable device 100 are not limited thereto. In addition, the components may be configured to include various known components, worn on or attached to a body of the user 10 in order to obtain physical activity data of the user 10.

The massage chair 200, a part performing a massage on each body part of the user 10 while the body of the user 10 is supported thereby, performs operations such as sweeping, kneading, pressing, pulling, tapping, or moving of each body part of the user 10, while the user 10 is sitting on or lying down on the massage chair 200.

In detail, the massage chair 200 may be divided into a hip/thigh support holding up and supporting a hip and a thigh of the user 10, an upper body support rotatably installed in one end of the hip/thigh support and supporting an upper body of the user 10, and a calf/foot support installed in the other end of the hip/thigh support and supporting a calf and a foot of the user 10. In this case, when the body of the user 10 is to be stretched, the upper body support and the calf/foot support may be rotated with respect to the hip/thigh support.

As described above, the massage chair 200 may be configured to perform a massage for relieving fatigue of each body part of the user 10 or stretching each body part, and to change the intensity or cycle of the performed massage.

The data analyzing unit 300, a part inferring condition data for each body part of the user 10 according to the activity data obtained by the wearable device 100, may infer the type of activity (for example, golf, soccer, or walking) of the user 10, muscles or joints of a body of the user 10 with a high degree of fatigue, or muscles or joints requiring stretching due to having been in a stiff state for a long period of time.

In detail, the data analyzing unit 300 may perform sensor fusion of the data, measured by each sensor of the wearable device 100 described above, in order to infer condition data for each body part of the user 10.

To this end, the data analyzing unit 300 may include a database server providing big data and fusion sensing data, required for applying various artificial intelligence algorithms, or may be connected to such a database server.

Thus, the data analyzing unit 300 may infer, for example, what type of activity has been performed by the user 10, at what degree of intensity the activity was performed, and for how long the activity was performed, through the activity data of the user 10 by deep learning of the artificial intelligence algorithm or the sensor fusion. Moreover, based on the information inferred as described above, a degree of fatigue for each part of the body and a degree of need of stretching may be inferred.

For example, as a result of the inferring performed by the data analyzing unit 300 through the activity data of the user 10, it may be inferred that golf was performed with a high degree of intensity over a certain period of time. In this case, it may be inferred that parts of the body such as the waist, arms, and legs were intensively used, and these parts of the body may thus have a relatively high degree of fatigue.

Alternatively, as a result of the inferring performed by the data analyzing unit 300 through the activity data of the user 10, it may be inferred that driving was performed over a long period of time. In this case, it may be inferred that parts of the body such as the waist, neck, and legs were in a stiff state for a long period of time, and may thus require a relatively large amount of stretching.

The controller 400, a part controlling an operation of the massage chair 200 according to the condition data inferred by the data analyzing unit 300, may control performance of a massage according to a degree of fatigue for each body part of the user 10 and a degree of need of stretching.

That is, according to the inferred result described above, a massage course of the massage chair 200 may be automatically set to focus particularly on a part of a body with a high degree of fatigue or a high degree of need of stretching when providing therapeutic care.

As described above, activity data of the user 10, generated before the therapeutic care is provided to the body of the user 10, is obtained, and an operation of the massage chair 200 may be controlled according to the condition data of the body inferred through the activity data. Thus, the body care apparatus 1000 according to an embodiment may more accurately determine a type and characteristics of the therapeutic care required by the user 10.

In addition, the condition data for each body part of the user 10 may be inferred according to the activity data of the user 10, and the condition data may be reflected for each body part when the massage chair 200 is operated. Thus, an optimal type of therapeutic care may be performed for each part of the body.

Moreover, the activity data of the user 10 may be naturally obtained through a wearable device worn on a body of the user 10, and the activity data may be reflected in an operation of the massage chair 200. Thus, the user 10 may easily use the body care apparatus 1000 without going through an additional inconvenient process.

The data storage unit 500 is a part storing the activity data obtained by the wearable device 100. When the massage chair 200 and the wearable device 100 are physically separated from each other in the daily life of the user 10, the data storage unit 500 may store the activity data until the activity data is transmitted to the data analyzing unit 300.

In order to transfer the obtained activity data to the data analyzing unit 300 instantaneously, without separately storing the obtained activity data, the wearable device 100 is required to always be connected to a network. Otherwise, there may be a limit on the amount of activity data to be used, and, for example, some activity data may be lost.

Thus, the data storage unit 500 may include a memory capable of storing data, and may thus store data without loss thereof even when the activity data of the user 10, accumulated over a certain period of time, is not instantaneously transmitted to the data analyzing unit 300.

In this manner, the activity data obtained by the wearable device 100 may be stored, and may then be reflected in an operation control of the massage chair 200. Thus, the body care apparatus 1000 according to an embodiment may improve reliability of the condition data inferred by using a large amount of activity data.

Here, the data storage unit 500 may be installed in the wearable device 100, and the wearable device 100 may include a transmitter 110 transmitting the activity data stored in the data storage unit 500. To this end, the wearable device 100 may be configured to include a communications module connected to a network, and a control module configured to transmit predetermined (prescribed) data through the communications module.

As described above, the obtained activity data may be stored in the wearable device 100, and may then be transmitted and reflected in the operation control of the massage chair 200. Thus, in the body care apparatus 1000 according to an embodiment, even when no additional data transmission process is performed by the user 10, transmission of data may be automatically performed.

Further, the data analyzing unit 300 and the controller 400 may be installed in the massage chair 200, and the massage chair 200 may include a receiver 210 receiving the transmitted activity data and transmitting the activity data to the data analyzing unit 300. That is, data may be directly transmitted between the wearable device 100 and the massage chair 200, without going through, for example a separate server.

As described above, the transmitted activity data may be received by the massage chair 200, condition data of a body may inferred by the massage chair 200 by itself, and the massage chair may be controlled according to the inferred condition data. Thus, the body care apparatus 1000 according to an embodiment may smoothly implement a function of the body care apparatus 1000, without going through, for example, a separate server.

Meanwhile, the network used in the transmitter 110 and the receiver 210 described above may be a wired or wireless network, such as a local area network (LAN), a wide area network (WAN), the Internet, an intranet, and an extranet, a mobile network such as cellular, third generation (3G), fourth generation (4G), long term evolution (LTE), fifth generation (5G), a wireless fidelity (Wi-Fi) network, and an ad-hoc network, and any suitable communications network including combinations thereof.

In detail, when a 5G network is used, due to the characteristics of super low latency and super connectivity, the artificial intelligence algorithm described above may be more smoothly applied, and Internet of Things (IoT) technology may be smoothly implemented in conjunction with other devices, other than the massage chair 200.

In this case, the network may include connection of network elements such as hubs, bridges, routers, switches, and gateways. The network may include one or more connected networks, such as a multiple network environment, including a public network such as the Internet and a private network such as a secure corporate private network. Access to the network may be provided via one or more wired or wireless access networks.

In the body care apparatus 1000 according to an embodiment, the wearable device 100 may be provided as a plurality of wearable devices, and the plurality of wearable devices 100 may share at least one data storage unit 500. That is, as illustrated in FIG. 4, the user 10 may simultaneously wear a plurality of wearable devices 100, 100a, 100b, 100c, 100d, 100e, and 100f, and thus obtain complex physical activity data.

However, in such a case, it may be inefficient for the data storage unit 500 to be installed in each wearable device 100, and thus for each piece of information to be individually stored therein. Thus, the body care apparatus 1000 may be configured such that the obtained activity data is transmitted to and stored in a specified device among the plurality of wearable devices 100, or the activity data is transmitted to a separate server through the network and stored therein.

As described above, the activity data of the user 10 obtained by the plurality of wearable devices 100 may be stored in at least one data storage unit 500. Thus, in the body care apparatus 1000 according to an embodiment, when the complex activity data of a body is obtained using the plurality of wearable devices 100, components for storing and transmitting data may be significantly reduced.

The data confirming unit 310, a part outputting activity data to the user 10 and confirming activity feedback data from the user 10 when a body of the user 10 is supported by the massage chair 200, may confirm that there is no error in the activity information measured prior to the use of the massage chair 200.

For example, when the user 10 is seated in the massage chair 200 in order to receive a massage, the data confirming unit 310 may output a guidance question such as "Do you have a long travel distance today?", or "Have you been sitting for a long time today?".

In response to the guidance question, the user 10 may provide activity feedback data by providing an answer such as "Yes", or "No, not really".

That is, the data confirming unit 310 may confirm the activity information measured by the wearable device 100 with the user 10, to check the accuracy thereof.

Accordingly, the data analyzing unit 300 may adjust the condition data according to the activity feedback data received through the confirmation of the data confirming unit 310. That is, if the activity data is determined to be incorrect as a result of confirming the activity feedback data, the activity data may be corrected, and the condition data may be inferred again.

As described above, feedback on the activity data may be received from the user 10, and the condition data may be adjusted according to the received feedback. Accordingly, the body care apparatus 1000 may further enhance accuracy of the activity data.

The operation guide unit 410 is a part outputting, to the user 10, operation data of the massage chair 200 set according to the condition data, and confirming operation feedback data with the user 10 when the body of the user 10 is supported by the massage chair 200. The operation guide unit 410 may confirm whether an operation course of the massage chair 200, set prior to the use of the massage chair 200, meets the requirements of the user 10.

For example, when the user 10 is seated in the massage chair 200 in order to receive a massage, the operation guide unit 410 may output a guidance comment such as "A massage will be performed for your fatigued legs", or "A full body massage will be performed with low intensity".

In response to the guidance comment, the user 10 may provide operation feedback data by providing an answer such as "Yes", or "No, my shoulders are really sore".

That is, the operation guide unit 410 may guide the operation course set by the controller 400, in advance, and then check whether the operation course is a massage course desired by the user 10.

Accordingly, the controller 400 may adjust an operation of the massage chair 200 according to the operation feedback data confirmed by the operation guide unit 410. That is, if the massage course is determined not to meet the requirements of the user 10 as a result of confirming the operation feedback data, the massage course may be corrected and set again.

As described above, the feedback on the operation data of the massage chair 200 may be received from the user 10, and an operation of the massage chair 200 may be adjusted according to the received feedback. Thus, in the body care apparatus 1000 according to an embodiment, the requirements of the user 10 may be reflected and more satisfactory therapeutic care may be provided.

Figure 5:
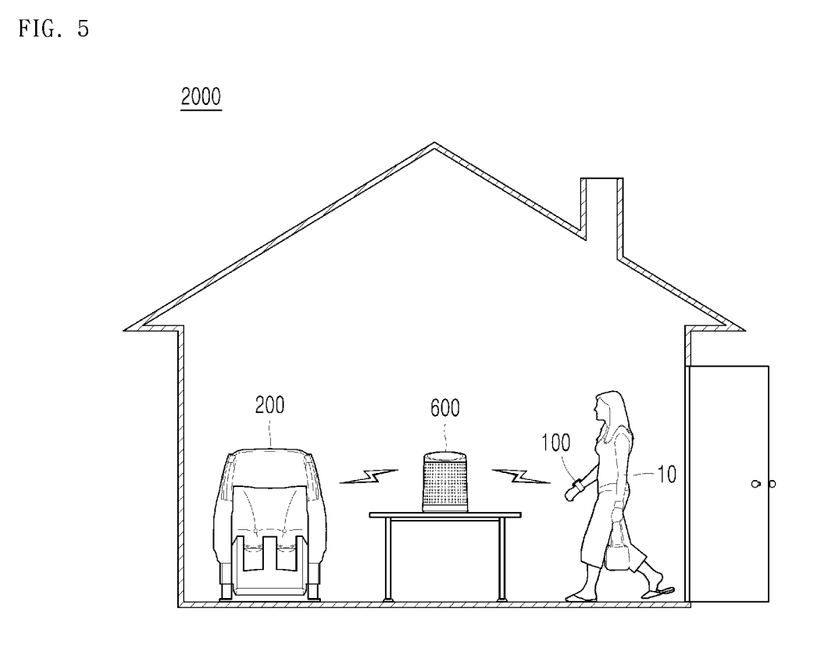
FIG. 5 is a view of a body care apparatus according to a second embodiment of the present disclosure.
Figure 6:
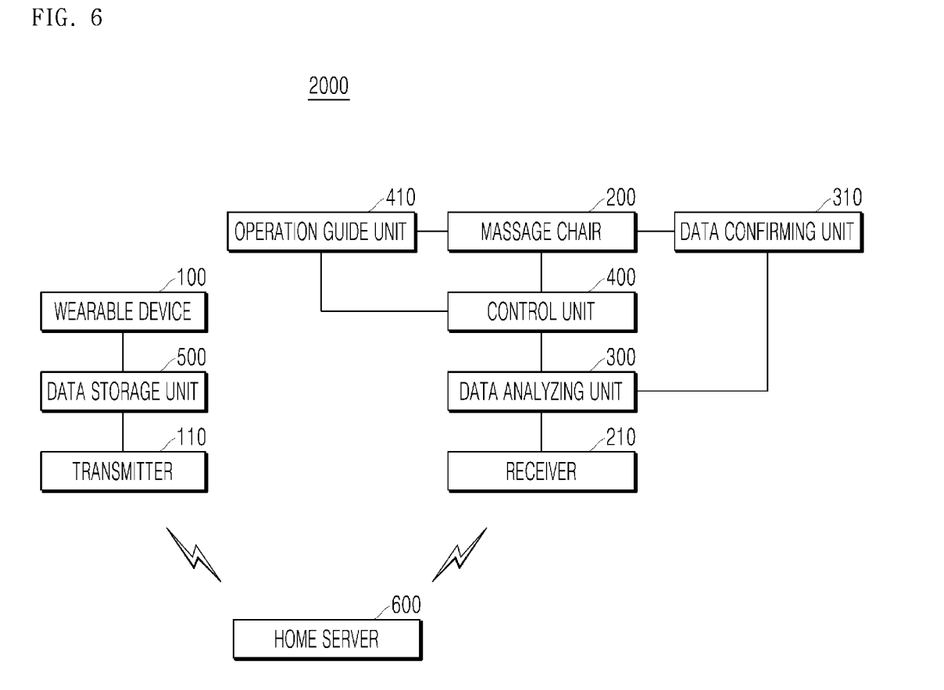
FIG. 6 is a schematic view of a main component of the body care apparatus according to the second embodiment of the present disclosure.

FIG. 5 is a view of a body care apparatus according to a second embodiment of the present disclosure. FIG. 6 is a schematic view of a main component of the body care apparatus according to the second embodiment of the present disclosure.

As illustrated in FIGS. 5 and 6, a body care apparatus 2000 according to the second embodiment of the present disclosure may include a wearable device 100, a massage chair 200, a data analyzing unit 300, a controller 400, and a home server 600, and may further include a data storage unit 500.

In this case, the wearable device 100, the massage chair 200, the data analyzing unit 300, the controller 400, and the data storage unit 500 are the same as or similar to those in the body care apparatus 1000 according to a first embodiment of the present disclosure described above, and thus detailed descriptions of the overlapping contents are omitted.

The home server 600, a part in communication with a device disposed within a set network area, may be installed in a network area specified by a user 10, and may perform data transmission and reception and a control function for devices connected via communications.

For example, the home server 600 may be configured to perform a function of a hub device of an Internet of Things for a household, and may exchange or control data with devices disposed in a network area within a certain range from the home server 600.

Moreover, the home server 600 may be provided as an individual device separately installed, or may be installed to be embedded in another device (for example, a refrigerator or a TV) in the home.

In the case of the body care apparatus 2000 including such a home server 600, a transmitter 110 may transmit activity data to the home server 600 when the wearable device 100 is accessed within a network area, and the home server 600 may extract only data about a massage chair 200 from the received activity data and transmit the extracted data to the massage chair 200 disposed within the network area.

For example, as illustrated in FIG. 5, when the user 10 returns to the home and enters the network area, the activity data may be transmitted from the wearable device 100 to the home server 600. In addition, the home server 600 may select the transmitted activity data, and may distribute and transmit data required by each device within the network area. In this process, the selected activity data may also be transmitted to the massage chair 200.

As described above, the home server 600 may receive the transmitted activity data, and extract only data about the massage chair 200, and may transmit the extracted data to the massage chair 200. Thus, according to the body care apparatus 2000 according to an embodiment, unnecessary data may be prevented from being transmitted to the massage chair 200, and issues relating to privacy in using an external server may be addressed.

Meanwhile, with the exception of the above-described component, the body care apparatus 2000 according to the second embodiment of the present disclosure is the same as or similar to the body care apparatus 1000 according to the first embodiment of the present disclosure, and thus detailed descriptions of the overlapping contents are omitted.

Figure 7:
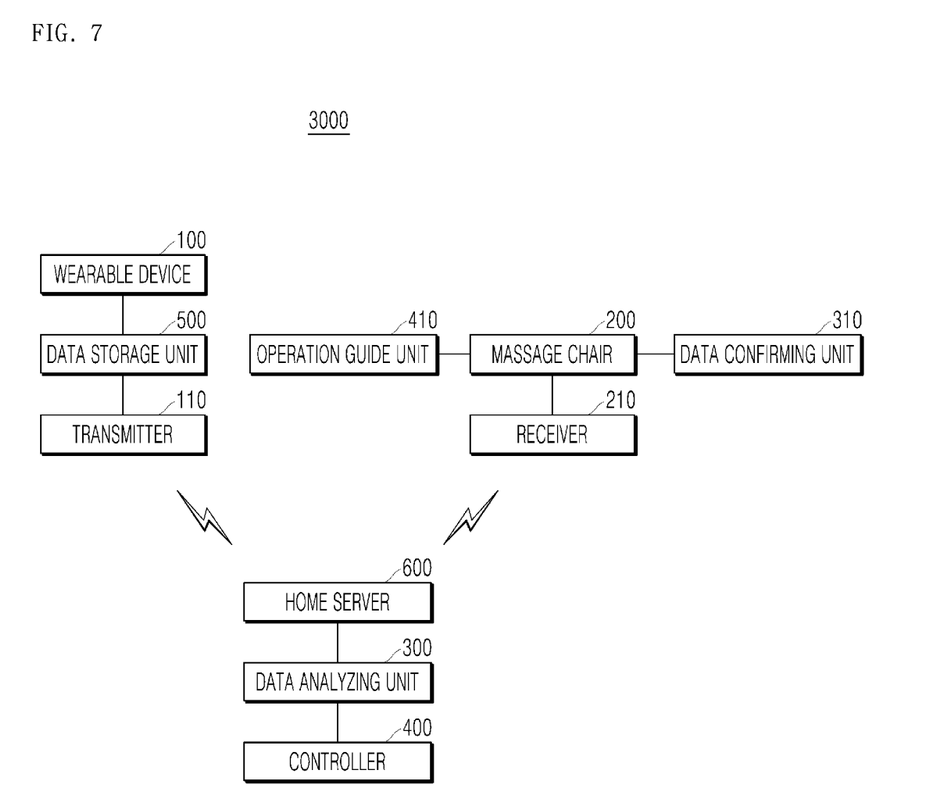
FIG. 7 is a schematic view of a main component of a body care apparatus according to a third embodiment of the present disclosure.

FIG. 7 is a schematic view of a main component of a body care apparatus according to a third embodiment of the present disclosure.

As illustrated in FIG. 7, in a body care apparatus 3000 according to the third embodiment of the present disclosure, a home server 600 may be provided with a data analyzing unit 300 and a controller 400 so as to communicate with a device disposed within a set network area.

In the case of the body care apparatus 3000 including the home server 600, a transmitter 110 may transmit activity data to the home server 600 when a wearable device 100 is accessed within a network area, and the home server 600 may transmit a control signal for controlling an operation of a massage chair 200 to the massage chair 200 disposed within the network area.

That is, inferring of condition data and operation control of the massage chair 200 are not performed in the massage chair 200 by itself. Rather, the condition data is inferred in the home server 600, and then an operation mode of the massage chair 200 may be determined based on the inferred condition data, and thus the massage chair 200 may be controlled through a network.

In this manner, the home server 600 may receive the transmitted activity data, and may then infer condition data of a body and transmit, to the massage chair 200, a control signal formed according to the inferred condition data. Thus, in the body care apparatus 3000 according to an embodiment, the massage chair 200 may operate in conjunction with various devices on a home network through the home server 600, and a structure of the massage chair 200 may be simplified.

Meanwhile, with the exception of the above-described component, the body care apparatus 3000 according to the third embodiment of the present disclosure is the same as or similar to the body care apparatus 1000 or 2000 according to the first embodiment or the second embodiment of the present disclosure, and thus detailed descriptions of the overlapping contents are omitted.

Figure 8:
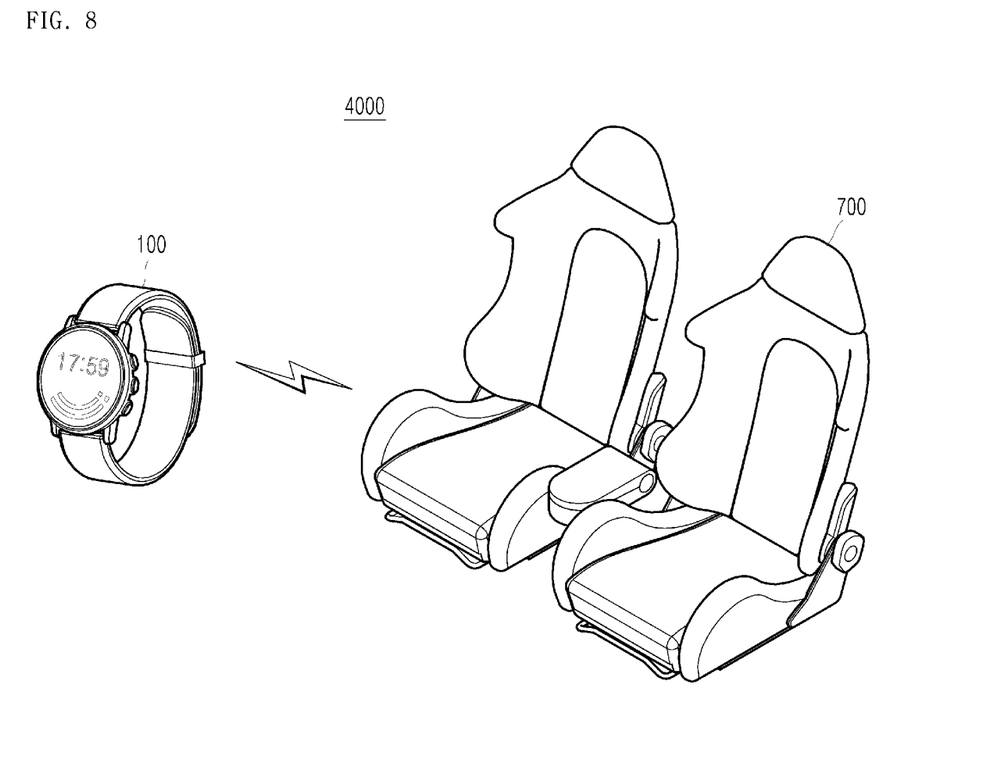
FIG. 8 is a view of a body care apparatus according to a fourth embodiment of the present disclosure.
Figure 9:
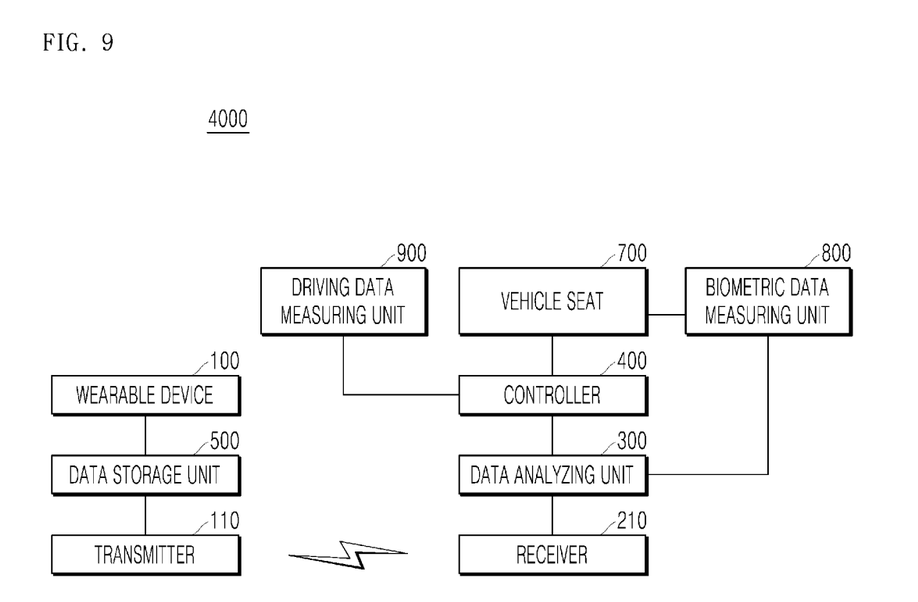
FIG. 9 is a schematic view of a main component of the body care apparatus according to the fourth embodiment of the present disclosure.

FIG. 8 is a view of a body care apparatus according to a fourth embodiment of the present disclosure. FIG. 9 is a schematic view of a main component of the body care apparatus according to the fourth embodiment of the present disclosure.

As illustrated in FIGS. 8 and 9, a body care apparatus 4000 according to the fourth embodiment of the present disclosure may include a wearable device 100, a vehicle seat 700, a biometric data measuring unit 800, a data analyzing unit 300, and a controller 400, and may further include a data storage unit 500 and a driving data measuring unit 900.

The wearable device 100 is a part worn on a body of a user 10 so as to obtain activity data of the user 10.

The vehicle seat 700 is a part applying stimulation to each body part of the user 10 riding in a vehicle, while supporting a body of the user 10, and may apply stimulation to each body part of the user 10 while the user 10 is sitting on or lying down on the vehicle seat 700. In this case, the stimulation may be applied in various forms, such as tactile stimulation to the skin, such as a hot feeling or a cold feeling, and stimulation for blood circulation through an electric field or a magnetic field, in addition to the types of massage described above.

In the case of the vehicle seat 700, individual operations of a component that correspond to each body part may be limited, in a manner different from the massage chair 200 described above. Since this case relates to a vehicle, in which there may be a relatively high safety risk, movements beyond a certain degree may threaten the safety of the user 10 while driving.

Moreover, in the case of the vehicle seat 700, the need for stretching is generally high, due to a specific body part being in a stiff state for a long period of time, rather than the case in which fatigue is accumulated due to the excessive use of a specific body part.

In this case, when a stretching function is performed for relaxation of muscles or joints, this may cause a driver to become drowsy or distracted.

Thus, it may be preferable that the body care apparatus 4000 including the vehicle seat 700 may further include a biometric data measuring unit 800, in addition to the main components of the body care apparatus 4000 including the massage chair 200 described above.

The biometric data measuring unit 800, a part measuring a biometric state of the user 10 supported by the vehicle seat 700 in real time so as to obtain biometric data of the user 10, may measure a blood pressure, a heart rate, a body temperature, and a respiration rate of the user 10 in real time.

For example, when the user 10 becomes drowsy, his or her blood pressure or heart rate may be lowered, or his or her body temperature or respiration rate may be lowered. Thus, the biometric data of the user 10 may be measured in real time so as to indirectly determine a current state of the user 10.

The data analyzing unit 300 may infer condition data for each body part of the user 10 according to activity data obtained from the wearable device 100 and biometric data obtained by the biometric data measuring unit 800 in real time.

That is, the data analyzing unit 300 may infer not only a degree fatigue for each part of a body and a degree of need of stretching based on the prior activity data, but also a degree of need of urgent care, based on the real time biometric data of the user 10.

The controller 400, a part controlling an operation of the vehicle seat 700 according to the condition data inferred by the data analyzing unit 300, may automatically set a stimulation course of the vehicle seat 700 to focus particularly on a body part with a high degree of fatigue, a high degree of need of stretching, or a high degree of need of urgent care according to the inferred result, when providing therapeutic care.

As described above, since activity data of the user 10, generated before the therapeutic care is provided to the body of the user 10, is obtained, and biometric data of the user 10 is obtained during a process in which the therapeutic care is provided to the body of the user 10, an operation of the vehicle seat 700 may be controlled according to condition data of the body inferred through the activity data and the biometric data. Thus, in the body care apparatus 4000 according to an embodiment, a type and characteristics of the therapeutic care required by the user 10 may be more accurately determined.

In addition, since condition data for each body part of the user 10 may be inferred according to the activity data and the biometric data of the user 10, and the condition data may be reflected for each body part when the vehicle seat 700 is operated, an optimal type of therapeutic care may be performed for each part of a body.

Moreover, activity data of the user 10 may be obtained through a wearable device worn on a body of the user 10, and the activity data may be reflected to an operation of the vehicle seat 700. Thus, the user 10 may easily use the body care apparatus 4000 without going through an additional inconvenient process.

The data storage unit 500, a part storing the activity data obtained from the wearable device 100, stores activity data before the activity data is transmitted to the data analyzing unit 300, when the vehicle seat 700 and the wearable device 100 are physically separated from each other in the daily life of the user 10.

As described above, the activity data, obtained from the wearable device 100, is stored, and is then reflected to operation control of the vehicle seat 700. Thus, in the body care apparatus 4000 according to an embodiment, reliability of the inferred condition data may be enhanced using a large amount of activity data.

Here, the obtained activity data may be stored in the wearable device 100, and may then be transmitted and reflected in the operation control of the vehicle seat 700. Thus, in the body care apparatus 4000 according to an embodiment, even when the user 10 does not perform an additional data transmission process, data may be automatically transmitted.

Further, the vehicle seat 700 may receive the transmitted activity data, and infer condition data of a body by itself and be controlled according to the inferred condition data. Thus, in the body care apparatus 4000 according to an embodiment, a function of the body care apparatus 4000 may be smoothly implemented without going through, for example, a separate server.

The driving data measuring unit 900, a part obtaining driving data of a vehicle by measuring a driving state of the vehicle in real time, may measure, for example, a speed of a vehicle, a direction thereof, and whether a vehicle suddenly accelerates or suddenly stops, in real time.

For example, when the user 10 becomes drowsy, driving of the vehicle may become dangerous, even when other abnormalities have not been measured by the biometric data measuring unit 800. Thus, a driving state of the vehicle which may be regarded as abnormal may be measured in real time, and thus occurrence of a dangerous situation may be indirectly determined.

Accordingly, the controller 400 may control an operation of the vehicle seat 700 according to the condition data inferred by the data analyzing unit 300 and the driving data obtained by the driving data measuring unit 900 in real time.

That is, when the driving is determined to have become dangerous as a result of the measurement of the driving data measuring unit 900, it is necessary to reflect the driving data directly in controlling an operation of the vehicle seat 700, rather than making an inference through the driving data. Thus, if abnormal driving data is measured, it is necessary to immediately stimulate the user 10 so as to inform the user of the danger or to call attention to the danger, through the vehicle seat 700.

As described above, driving data of a vehicle may obtained in real time, and an operation of the vehicle seat 700 may be controlled according to condition data and driving data. Thus, in the body care apparatus 4000 according to an embodiment, a type and characteristics of the therapeutic care provided for the user 10 may be suitably changed according to the driving state of the vehicle.

Meanwhile, with the exception of the above-described component, the body care apparatus 4000 according to the fourth embodiment of the present disclosure is the same as or similar to the body care apparatuses 1000, 2000, and 3000 according to the first embodiment to the third embodiment of the present disclosure, and thus detailed descriptions of the overlapping contents are omitted.

While the foregoing has been given by way of illustrative example of the present disclosure, all such and other modifications and variations thereto as would be apparent to those skilled in the art are deemed to fall within the broad scope and ambit of this disclosure as is herein set forth.

What is claimed is:

1. A body care apparatus, comprising:
a wearable device configured to obtain activity data of a user, when the wearable device is worn by the user;
a massage chair configured to provide massage to body parts of the user;
a data analyzing unit configured to obtain condition data for each of the body parts according to the activity data obtained by the wearable device; and
a controller configured to cause operation of the massage chair according to the condition data obtained by the data analyzing unit,
wherein the activity data is obtained before the body care apparatus is used by the user in order to infer a type of activity of the user in advance.

2. The body care apparatus of claim 1, further comprising a data storage unit configured to store the activity data obtained by the wearable device.

3. The body care apparatus of claim 2, wherein the data storage unit is located in the wearable device, and
wherein the wearable device includes a transmitter configured to transmit the activity data.

4. The body care apparatus of claim 3, wherein the data analyzing unit and the controller are physically coupled to the massage chair, and
wherein the massage chair includes a receiver configured to receive the transmitted activity data for providing the activity data to the data analyzing unit.

5. The body care apparatus of claim 4, further comprising:
a server configured to communicate with a network,
wherein the transmitter transmits the activity data to the server when the wearable device is accessed while within the network; and
wherein the server obtains, from the received data, data as to the massage chair, and transmits the obtained data to the massage chair that is located within the network area.

6. The body care apparatus of claim 3, further comprising:
a server that includes the data analyzing unit and the controller, to communicate with a device located within a network,
wherein the transmitter transmits the activity data to the server when the wearable device is accessed while within the network; and
wherein the server transmits a control signal to the massage chart that is within the network, wherein the control signal is for controlling an operation of the massage chair.

7. The body care apparatus of claim 1, wherein the wearable device includes a plurality of wearable devices that share at least one data storage unit.

8. The body care apparatus of claim 1, further comprising:
a data confirming unit configured to:
output the activity data for the user and to confirm activity feedback data from the user, when the user is positioned at the massage chair; and
adjust the condition data according to the activity feedback data.

9. The body care apparatus of claim 8, further comprising:
an operation guide unit configured to:
output, to the user, operation data of the massage chair which is set according to the condition data and confirm operation feedback data from the user, when the user is positioned at the massage chair; and
wherein the controller is further configured to control an operation of the massage chair according to the operation feedback data.

10. The body care apparatus of claim 1, wherein the data analyzing unit infers the condition data by deep learning of an artificial intelligence algorithm or a sensor fusion.

11. A body care apparatus, comprising:
a wearable device configured to obtain activity data of a user, when the wearable device is worn by the user;
a seat configured to provide stimulation to body parts of the user located in a vehicle;
a biometric data measuring unit measuring, in real time, a biometric state of the user positioned at the seat to obtain biometric data of the user;
a data analyzing unit configured to obtain condition data for each of the body parts according to the activity data obtained by the wearable device and the biometric data obtained by the biometric data measuring unit; and
a controller configured to cause operation of the seat according to the condition data obtained by the data analyzing unit,
wherein the activity data is obtained before the body care apparatus is used by the user in order to infer a type of activity of the user in advance.

12. The body care apparatus of claim 11, further comprising a data storage unit configured to store the activity data obtained by the wearable device.

13. The body care apparatus of claim 12, wherein the data storage unit is located in the wearable device, and
wherein the wearable device includes a transmitter configured to transmit the activity data.

14. The body care apparatus of claim 13, wherein the biometric data measuring unit, the data analyzing unit and the controller are physically coupled to the seat, and
wherein the seat includes a receiver configured to receive the transmitted activity data for providing the activity data to the data analyzing unit.

15. The body care apparatus of claim 11, further comprising:
a driving data measuring unit configured to measure a driving state of the vehicle in real time to obtain driving data of the vehicle,
wherein the controller is further configured to:
control an operation of the seat according to the condition data and the driving data.

16. The body care apparatus of claim 11, wherein the data analyzing unit infers the condition data by deep learning of an artificial intelligence algorithm or a sensor fusion.

17. An apparatus, comprising:
a massage chair configured to provide massage to body parts of a user;
a controller configured to:
obtain, from a wearable device of the user, activity data of the user when the wearable device is worn by the user;
obtain condition data for each of the body parts according to the activity data obtained from the wearable device; and
cause operation of the massage chair according to the condition data,
wherein the activity data is obtained before the apparatus is used by the user in order to infer the type of activity of the user in advance.

* * * * *